US008907847B2

(12) United States Patent
Tong et al.

(10) Patent No.: US 8,907,847 B2
(45) Date of Patent: Dec. 9, 2014

(54) DIRECTIONAL ANTENNA SYSTEM FOR PORTABLE COMMUNICATION DEVICE

(76) Inventors: Hing S. Tong, Saratoga, CA (US); Haixian Liu, Alameda, CA (US)

( * ) Notice: Subject to any disclaimer, the term of this patent is extended or adjusted under 35 U.S.C. 154(b) by 308 days.

(21) Appl. No.: 13/462,665

(22) Filed: May 2, 2012

(65) Prior Publication Data

US 2013/0293417 A1 Nov. 7, 2013

(51) Int. Cl.
*G01S 5/04* (2006.01)

(52) U.S. Cl.
USPC .......................................................... 342/432

(58) Field of Classification Search
USPC ................................. 342/432, 445, 419, 416
See application file for complete search history.

(56) References Cited

U.S. PATENT DOCUMENTS

| | | | | |
|---|---|---|---|---|
| 5,940,039 | A | 8/1999 | Wang et al. | |
| 6,249,256 | B1 | 6/2001 | Luxon et al. | |
| 6,344,833 | B1 | 2/2002 | Lin et al. | |
| 6,489,926 | B2 | 12/2002 | Jarvis et al. | |
| 6,603,430 | B1 | 8/2003 | Hill et al. | |
| 6,615,026 | B1 | 9/2003 | Wong | |
| 6,707,431 | B2 | 3/2004 | Byun et al. | |
| 6,731,920 | B1 | 5/2004 | Iwai et al. | |
| 6,980,772 | B1 | 12/2005 | Underbrink et al. | |
| 7,023,385 | B2 | 4/2006 | Harihara | |
| 7,031,762 | B2 | 4/2006 | Shoji et al. | |
| 7,117,024 | B1 | 10/2006 | Dorfman | |
| 7,392,030 | B2 | 6/2008 | Sunaga | |
| 8,674,878 | B2 * | 3/2014 | Wu et al. | 342/374 |
| 2003/0016178 | A1 * | 1/2003 | Byun et al. | 343/702 |
| 2010/0113111 | A1 | 5/2010 | Wong | |
| 2010/0234081 | A1 | 9/2010 | Wong et al. | |
| 2011/0298671 | A1 * | 12/2011 | Qi et al. | 343/702 |
| 2012/0202560 | A1 * | 8/2012 | Donaldson | 455/552.1 |

FOREIGN PATENT DOCUMENTS

WO WO 2012066563 A2 * 5/2012

* cited by examiner

*Primary Examiner* — Harry Liu

(57) ABSTRACT

A directional antenna system for portable communication device that provides user control on the transmit antennas. The directional antenna system is made by two or more directional antennas with the directional antennas arranged in the pattern such that one of the directional antenna is pointing towards the user and the other directional antenna(s) are pointing away from the user. The directional antenna system is designed to cover a 360 degree circle in both the receiving and transmitting mode. In one of the transmitting mode, the portable communication device transmits RF signal on the directional antenna(s) that is pointing away from the user to minimize the electromagnetic energy exposure to the user. In the case when the RF receiving signal is below the desired operating condition on the outward pointing directional antenna(s), the portable communication device will generate an alert to the user.

9 Claims, 4 Drawing Sheets

Portable communication system with one directional antenna radiating toward user

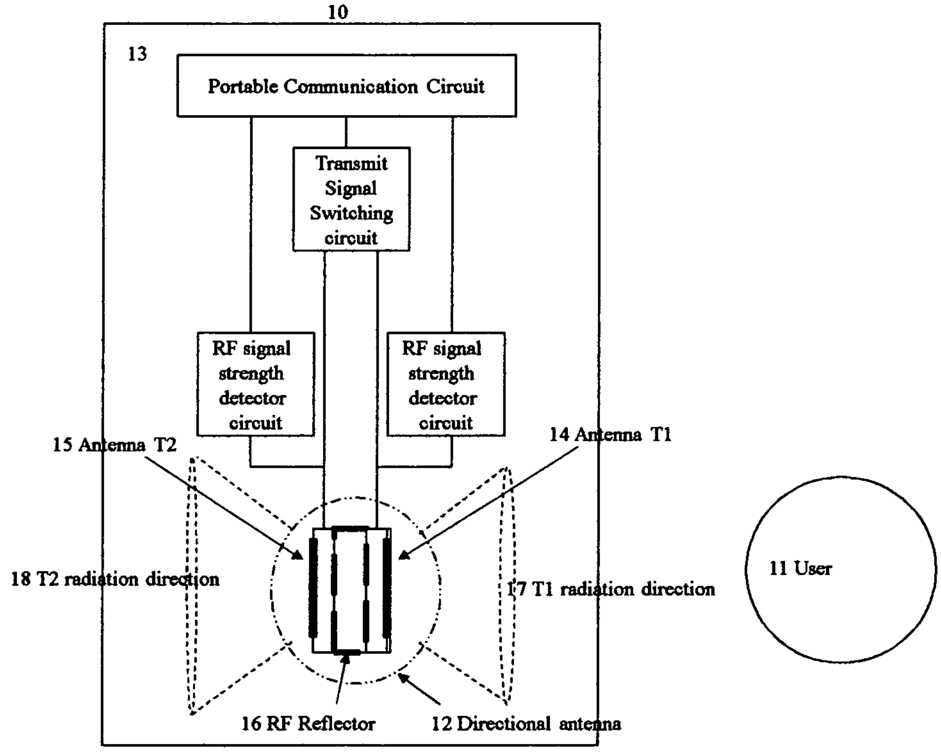
Fig 1. Portable communication system with one directional antenna radiating toward user

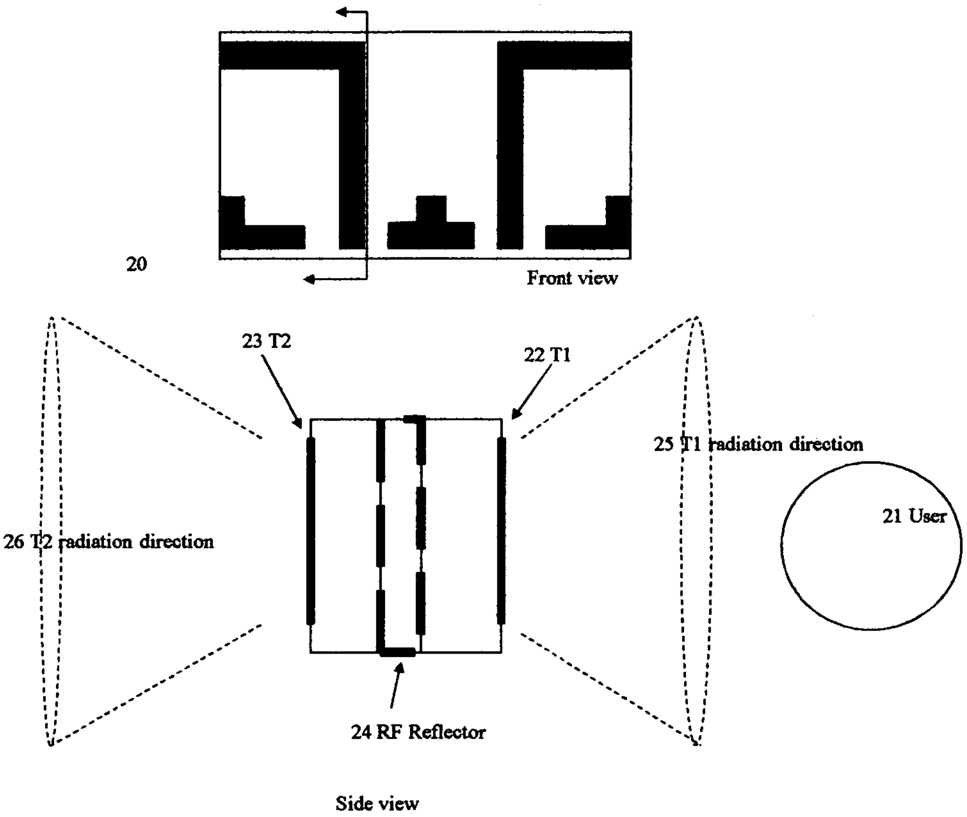
Fig 2. Two 180 degree directional antenna design – front and side view

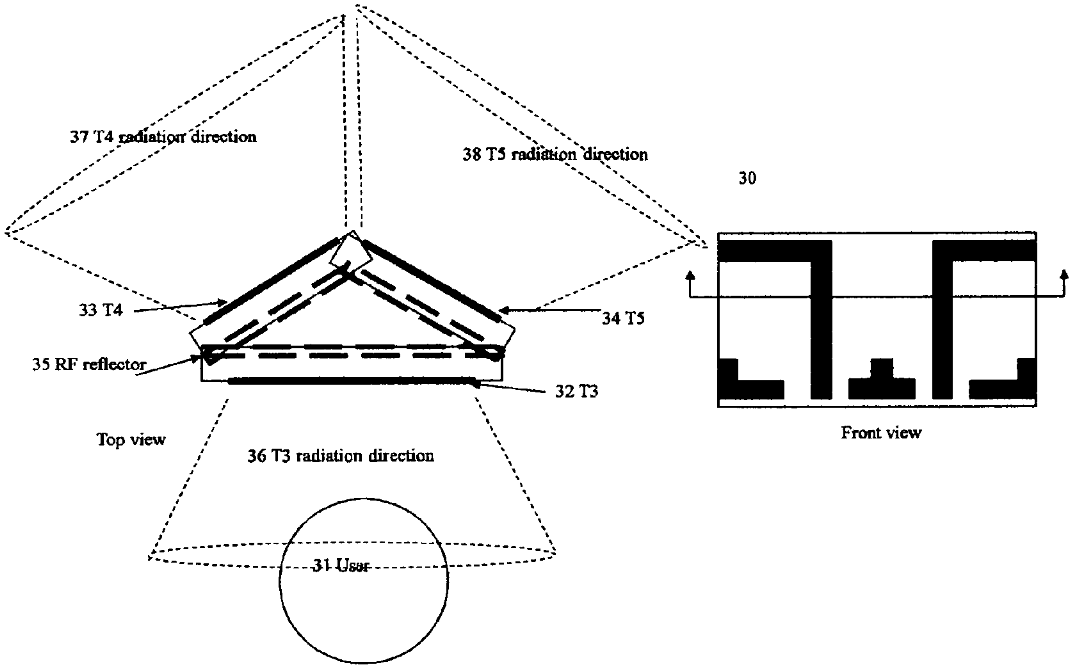
Fig 3. Three 180 degree directional antenna design – front and top view

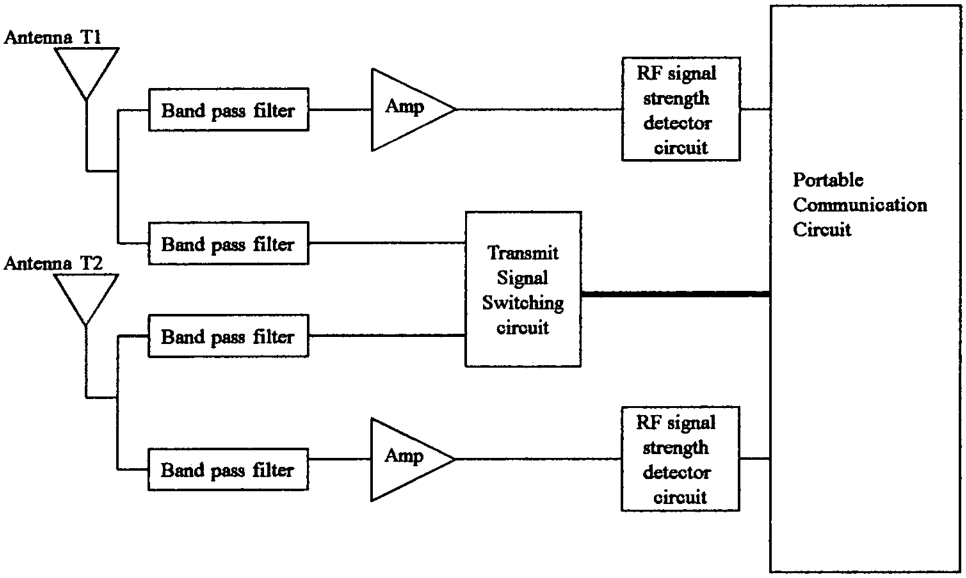
Fig 4. Two antenna Portable Communication Device block diagram

DIRECTIONAL ANTENNA SYSTEM FOR PORTABLE COMMUNICATION DEVICE

BACKGROUND OF THE INVENTION

1. Field of the Invention

Embodiments of the present invention generally relate to a directional antenna system for portable communication system. More specifically, embodiments of the present invention relate to a directional antenna system, a transmit antenna control circuit, a warning system on the RF receiving signal strength and a transmit antenna user control interface to allow the user to operate the portable communication system in a low electromagnetic energy emission mode and provide an alert when the transmit directional antenna that is pointing towards the user is in operation.

2. Description of the Related Art

Antenna designs employed in the present mobile communication systems are generally using a monopole antenna design. This monopole antenna design provided a 360° operation angle and has good bi-direction RF communication to the transmitter and receiver base towers. The antenna can be in pole shape or in planar shape for compact assembly. As people become more aware of increasing electromagnetic energy exposures from operating mobile communication system, this monopole antenna design exposes the user to the electromagnetic energy due to the 360° antenna operation design.

There is an opportunity to improve the antenna operation to minimize the exposure of the electromagnetic energy to the user as described in the patents by Wang et al., Luxon et al., Jarvis et al. and Kunz on methods in shielding the user from the monopole antenna. The issues in these approaches are lower antenna efficiency in both transmitting and receiving the RF signal as part of the antenna operating angle is limited by the antenna shield. In the patent application by Wong et al., they uses a passive metal shield over their planar antenna system and thus have the similar issues as the patent described above.

Other technique using directional antenna as described in the patent by Dorfman using a 60 degree forward and backward pointing directional antenna. The narrow operating angle allows the user to stay away from the operating electromagnetic energy but the signal quality of the communication device and the reliability usage is also limited because of this narrow operating angle. In the patent described by Underbrink et al. they uses a directional antenna that is pointing away from the user. The communication device has only a partial antenna operating angle and is strongly restricting the user's mobility and this technique also requires base station modification.

Other antenna control technique as described in the patent by Sunaga using a plurality of built-in antennas in the cell phone and select the antenna with the best reception level. The antennas in use are not designed and arranged to minimize the electromagnetic radiation to the user.

SUMMARY OF THE INVENTION

The present invention describes an antenna system for portable communication system that is fabricated by multiple directional antennas. This multiple directional antenna system is designed to cover 360 degree circle for optimal signal reception and transmission.

A variation of the antenna system is a dual directional antenna system fabricated by two opposite facing 180 degree directional antennas so that the antenna system operates in a full 360 degree circle. The directional antennas with reference to the portable communication system are orientated such that one antenna T1 pointing in the direction towards the user and the other antenna T2 pointing in the direction away from the user.

In normal operation, both antennas are in use when receiving the radio signal. The communication system monitors the receiving signal strength on both antennas T1 and T2 at all times. When the signal condition is above the operating level on antenna T2, the communication system will select the antenna T2 (that is pointing in the direction away from the user) to transmit RF radio signal. T1 will only be used as receiving antenna in this situation. This will minimize the electromagnetic energy exposure to the user as the electromagnetic energy is radiating away from the user. In the condition that the antenna reception signal on T2 falls below operating level, T1 will be used for transmitting the RF radio signal. The communication system in this situation will generate an alert signal to notify the user that T1 antenna is being used. The user can decide on maintaining the same communication system position that will use antenna T1 as transmitter or selected an alternative position or orientation by either switching side or rotating the communication system to a different angle of operation so that the antenna T2 RF radio signal is back to operating level.

In another variation, the antenna system is a triple-directional antenna system fabricated by three 120 to 180 degree directional antennas forming a triangle with one antenna (T3) pointing in the direction towards the user and the other two antennas (T4, T5) pointing at an angle in the direction away from the user. When the T4 and/or T5 antenna reception signal is above operating level, the antenna T4 and/or T5 will be used for transmitting the RF radio signal while T3 will be used as receiving antenna in this situation. When both antenna T4 and T5 falls below the operating level, antenna T3 (pointing in the direction towards the user) is selected to transmitting the radio signal. The communication system will generate an alert signal to notify the user on T3 antenna is being used as transmitter. The user can decide on maintaining the same communication system position that is using antenna T3 as transmitter or selected an alternative communication system position by either switching side or rotating to a different angle of operation to allow the communication system to select antenna T4 or T5 for transmitting the radio signal when the reception level on either T4 or T5 is in operating level.

BRIEF DESCRIPTION OF THE DRAWINGS

Advantage of one or more disclosed embodiments may become apparent upon reading the following detailed description and upon reference to the drawings in which:

FIG. 1 is a sketch illustrates the operation relationship of the user, the communication system and the directional antenna system, according to one or more embodiments described herein;

FIG. 2 is a sketch depicting a two 180° directional antenna system of the portable communication system and the directional antenna's electromagnetic energy emission relative to the user, according to one or more embodiments described herein;

FIG. 3 is a sketch depicting a three 180° directional antenna system of the portable communication system and the directional antenna's electromagnetic energy emission relative to the user, according to one or more embodiments described herein FIG. 4 is a two antenna switching control diagram depicting the antenna control logic of the portable communication device, according to one or more embodiments described herein;

DETAILED DESCRIPTION

An embodiment of the present invention will be described with the accompanying drawing shown in FIGS. 1 to 4.

FIG. 1 shows the operational relationship 10 between the user 11 and a built-in directional antenna system 12 inside the communication system 13. The directional antenna 12 which is built by placing two 180 degree directional antennas T1 14 and T2 15 in a back to back arrangement. The antennas are separated by a reflector 16 so that the T1 antenna electromagnetic energy radiation pattern 17 and the T2 antenna electromagnetic energy radiation pattern 18 are in opposite directions. For this antenna design, the directional antenna T1 14 of the directional antenna system 12 is pointing towards the user 11. In this antenna arrangement, when the communication system 13 is in the receiving function, both antenna T1 14 and T2 15 are in use providing a 360 degree reception circle. When the communication system 13 is in normal transmit function, the antenna signal level detection circuit will monitor each of the antenna reception level on T1 14 and T2 15 and selected one or both antenna with the proper operating level for the transmit function. When the communication system 13 is in reduced electromagnetic energy mode, the system will perform the following determination with the antenna data. When the antenna T2 15 is within the operating level, the communication system 13 will always select antenna T2 15 as the primary transmit antenna. The communication system 13 will select T1 14 as the transmitting antenna only when antenna T2 15 is outside the operating signal level. Before switching to antenna T1 14, the communication system 13 will generate an alert signal to the user 11 in the form of sound, voice message, vibration, display, light or a combination of the above; notifying the user that the electromagnetic energy will be radiating from antenna T1 14. The user 11 can then decided to change the position or the orientation of the communication system 13 so that the antenna T2 15 signal level is back in operating range and regain transmit control.

FIG. 2 is an expanded view depicting an illustrative system dynamics of a two 180 degree directional antenna design 20 with respect to the user 21. The directional antenna system 20 is consisted of two 180 degree directional antennas T1 22 and T2 23 which are placed in a back to back arrangement separated by a reflector 24. The antenna T1 22 is placed close to the user 21 with T1 electromagnetic energy 25 radiating towards to the user 21 and the antenna T2 23 and its electromagnetic energy 26 radiating away from the user 21. When antenna T2 23 is used in the transmit function, the communication system is operating in low radiation mode.

FIG. 3 is an expanded top view depicting an illustrative system dynamics of a three 120 to 180 degree directional antenna design 30 with respect to the user 31. The directional antenna system 30 is consisted of three 120 to 180 degree directional antennas T3 32, T4 33 and T5 34 which are placed in a triangular arrangement separated by a triangular reflector 35. The antenna T3 32 is placed close to the user 31 with T3 electromagnetic energy 36 radiating towards to the user 31 and the antenna T4 33, T5 34 and their respective electromagnetic energy 37 and 38 radiating away from the user 31. When antenna T4 33 or T5 34 is used in the transmit function, the communication system is operating in low radiation mode.

FIG. 4 is a typical example of the two directional antenna system schematic as described in FIG. 1. When the communication system is power on, system will completed the start up procedure and linked to the service provider. The communication system will check for settings on the Electromagnetic radiation modes and go into standby waiting for incoming or outgoing call activities. The communication system constantly checking the antenna signal strength on each T1 and T2 directional antennas. This control schematic allows the communication to select T1 and/or T2 as the transmitting antenna depending on the Electromagnetic radiation mode setting.

The communication system provided a user control interface for the user to control the antenna operation modes. One mode is for normal 360 degree transmit and receive or the other mode is for Low Electromagnetic radiation mode with the transmit antenna control and alert signal warning the user on radiation exposure by sound, display, vibration or combination of the above.

What is claimed is:

1. A portable communication device comprising:

A portable communication circuit;

a directional antenna system that is configured to operate in a 360 degree circle;

a RF transmit signal switching circuit;

a receiving RF signal strength detection circuit;

wherein the directional antenna system consist of two or more directional antennas forming a single antenna assembly;

wherein the directional antenna system consist of RF reflector(s) separating the directional antennas;

wherein the portable communication circuit receive continuous RF signal from 360 degree direction using the directional antenna system;

wherein the receiving RF signal strength detection circuit is configured to determine the signal strength on each individual directional antenna in the directional antenna system;

wherein the portable communication circuit control the transmit signal switching circuit;

wherein the transmit signal switching circuit is configured to transmit the RF signal from one or all antennas in the directional antenna system;

wherein the portable communication circuit do not change or modify the RF transmit and receive radiation pattern on the individual directional antenna in the directional antenna system.

2. A portable communication device as in claim 1, wherein the directional antenna system is constructed of two back to back 180 degree directional antennas with a RF reflector separating the antennas, where one antenna is position pointing towards the user and the second antenna pointing away from the user.

3. A portable communication device as in claim 2 wherein the portable communication device detects the receiving RF signal strength on each directional antennas and output a weak signal alert when the antennas receiving signal strength fall below a preset signal level.

4. A portable communication device as in claim 1, wherein the transmit signal power is changed when only one antenna is selected by the transmit signal switching circuit to reduce transmit power.

5. A portable communication device as in claim 1, wherein the antenna system is constructed with three directional antennas forming a triangular shape with a RF reflector separating the three antennas.

6. A portable communication device as in claim 5, wherein portable communication circuit detect the receiving antenna RF signal strength on each directional antenna and output an alert signal when the two outward pointing antennas signal strength fall below a preset signal level.

7. A portable communication device as in claim 5, wherein the transmit signal switching circuit can transmit the RF signal from any one or any combination of the three antennas.

8. A portable communication device as in claim 1, wherein the portable communication circuit normally turn off the transmit signal to the antenna that is pointing towards the user when the outward pointing directional antenna signal level is within the operating range of the system.

9. A portable communication device as in claim 1, wherein the portable communication device control interface firmware allows the user to select the transmit antenna.

* * * * *